(12) United States Patent
Paul et al.

(10) Patent No.: US 8,675,224 B2
(45) Date of Patent: Mar. 18, 2014

(54) MUTUALISTIC ENGINE CONTROLLER COMMUNICATING WITH PRINTER NON-VOLATILE MEMORY

(75) Inventors: Peter Paul, Webster, NY (US); Aaron M. Burry, Ontario, NY (US); Bruce Earl Thayer, Spencerport, NY (US); Michael F. Zona, Holley, NY (US)

(73) Assignee: Xerox Corporation, Norwalk, CT (US)

( * ) Notice: Subject to any disclaimer, the term of this patent is extended or adjusted under 35 U.S.C. 154(b) by 1029 days.

(21) Appl. No.: 12/730,633

(22) Filed: Mar. 24, 2010

(65) Prior Publication Data

US 2010/0321726 A1 Dec. 23, 2010

Related U.S. Application Data

(63) Continuation-in-part of application No. 12/487,756, filed on Jun. 19, 2009, now Pat. No. 8,422,058.

(51) Int. Cl.
| | |
|---|---|
| *G06F 3/12* | (2006.01) |
| *G06K 15/22* | (2006.01) |
| *G06K 15/02* | (2006.01) |
| *G01D 9/42* | (2006.01) |
| *G06F 15/16* | (2006.01) |

(52) U.S. Cl.
USPC ............. 358/1.15; 358/1.1; 358/1.2; 358/1.4; 346/107.3; 709/247

(58) Field of Classification Search
USPC ................. 358/1.1, 1.15, 1.4, 1.2, 1.9; 710/1; 709/274, 247; 346/107.3
See application file for complete search history.

(56) References Cited

U.S. PATENT DOCUMENTS

| 4,591,900 | A | 5/1986 | Heeb et al. |
| 4,896,207 | A | 1/1990 | Parulski |
| 6,032,004 | A | 2/2000 | Mirabella, Jr. et al. |
| 6,102,508 | A * | 8/2000 | Cowger ............................ 347/7 |
| 6,608,988 | B2 | 8/2003 | Conrow |
| 6,694,064 | B1 | 2/2004 | Benkelman |
| 7,146,112 | B2 | 12/2006 | Phipps et al. |
| 7,193,749 | B2 * | 3/2007 | Narushima et al. ............ 358/1.9 |
| 7,224,917 | B2 | 5/2007 | Julien et al. |
| 7,237,771 | B2 | 7/2007 | Lang et al. |
| 7,310,156 | B2 * | 12/2007 | Watanabe et al. .............. 358/1.1 |

(Continued)

OTHER PUBLICATIONS

U.S. Appl. No. 12/730,503, Office Action Dated Feb. 21, 2013, pp. 1-28.

(Continued)

*Primary Examiner* — Firmin Backer
*Assistant Examiner* — Jonathan Beckley
(74) *Attorney, Agent, or Firm* — Gibb & Riley, LLC

(57) ABSTRACT

A printing device includes at least one printing engine that has actuators and sensors. At least one engine controller is operatively connected to the printing engine, the engine controller uses software to control operations of the printing engine. At least one non-volatile memory is operatively connected to the engine controller. The non-volatile memory stores values used by the engine controller to control operations of the printing engine. Further, at least one adapter card is operatively connected to the non-volatile memory and to the actuators and sensors. The adapter card stores data and receives sensor feedback from the sensors. The adapter card uses the data and the sensor feedback to control the actuators by bypassing the engine controller when communicating with the actuators. The adapter card provides adapter card feedback to the non-volatile memory.

20 Claims, 11 Drawing Sheets

(56) References Cited

U.S. PATENT DOCUMENTS

| | | |
|---|---|---|
| 7,471,905 B2 | 12/2008 | Cook |
| 7,529,491 B2 * | 5/2009 | Rommelmann et al. ......... 399/12 |
| 7,593,130 B2 * | 9/2009 | Mongeon et al. .............. 358/1.4 |
| 7,817,292 B2 * | 10/2010 | Fujii ........................... 358/1.15 |
| 7,933,034 B2 * | 4/2011 | Takano ........................ 358/1.15 |
| 7,990,555 B2 * | 8/2011 | Kato et al. ................... 358/1.15 |
| 2002/0059479 A1 * | 5/2002 | Hardy et al. ....................... 710/1 |
| 2002/0078012 A1 | 6/2002 | Ryan et al. |
| 2002/0130957 A1 | 9/2002 | Gallagher et al. |
| 2005/0094203 A1 | 5/2005 | Rodriguez et al. |
| 2006/0080672 A1 | 4/2006 | Smith et al. |
| 2008/0257955 A1 | 10/2008 | Adachi |
| 2010/0289845 A1 | 11/2010 | Conway et al. |

OTHER PUBLICATIONS

U.S. Appl. No. 12/730,512, Office Action Communication Dated Jun. 22, 2012, pp. 1-17.

U.S. Appl. No. 12/244,395, filed Oct. 2, 2008, Burry et al.

U.S. Appl. No. 12/730,512, Office Action Dated Dec. 14, 2012, pp. 1-17.

U.S. Appl. No. 12/487,756, Office Action Dated Feb. 23, 2012, pp. 1-13.

U.S. Appl. No. 12/487,756, Office Action Dated Aug. 6, 2012, pp. 1-17.

U.S. Appl. No. 12/730,503, filed Mar. 24, 2010, Notice of Allowance Communication, Dated Jun. 17, 2013, 16 pages.

* cited by examiner

MUTUALISTIC ENGINE CONTROLLER COMMUNICATING WITH PRINTER NON-VOLATILE MEMORY

CROSS-REFERENCE TO RELATED APPLICATIONS

This application is related to the following co-pending applications filed concurrently herewith by the same Applicants and assigned to the same Assignee: "MUTUALISTIC ENGINE CONTROLLER HAVING SENSOR COMMUNICATION," U.S. application Ser. No. 12/730,503 and "MUTUALISTIC ENGINE CONTROLLER HAVING CUSTOMER REPLACEABLE UNIT COMMUNICATION," U.S. application Ser. No. 12/730,512. The complete disclosures of these co-pending applications are incorporated herein by reference.

BACKGROUND AND SUMMARY

Embodiments herein generally relate to electrophotographic printers and copiers or reproduction machines, and more particularly, concerns an adapter card that can bypass the print engine controller to directly change values within a printer's non-volatile memory, based on data maintained by customer replaceable units.

Many recent advances in printing focus on better integration of control systems with the hardware and materials to improve run cost and other functionally important topics (FITs). Many of the concepts and proposals being developed require some level of software integration to gain the full run cost or other FIT benefits. While there is some input to the control software for a manufacturer's developed products, for outsourced or acquired products, the "hooks" into the software to implement advanced technology concepts are lacking, and getting outsource vendors to provide the appropriate taps into the machine control is sometimes difficult. Some of these concepts could benefit the current machine population in the field greatly, but would require a costly and nearly unfeasible software upgrade to implement. In such instances, a manufacturer would likely have very little control of the system software, but would want to inject value-add technologies to improve the performance and robustness of these base engines.

This disclosure outlines a method of obtaining the required control "hooks" in an outsourced print controller that enables concepts being developed to improve run cost and other FITs in current and future acquired engines. Most print engines support some form of external updates of their non-volatile memory (NVM)—through a front panel user interface, service interface, TCP/IP connection, print job submission interface, etc. By adding a low cost electronic module to the engine that communicates with the customer replaceable unit memory, often through RFID interface, and the machine control unit (MCU), embodiments herein use an image path actuation or other actuators within the machine. In addition, they may require inputs that are outside the scope of just NMV.

Embodiments herein take advantage of the standard interfaces normally provided by the machine control unit to enable implementation of technology concepts without requiring changes to the system software of the engine. In addition, the embodiments herein enable manufacturing to modify machine settings on a cartridge by cartridge basis to enable improvements that are developed during the machine's life cycle, without requiring a service engineer to make any software upgrades or unscheduled maintenance, and without requiring any special "hooks" within the machine's engine control software.

More specifically, embodiments herein comprise a printing device that includes at least one printing engine that has actuators and sensors. At least one engine controller is operatively connected to the printing engine, the engine controller uses software to control operations of the printing engine. At least one non-volatile memory is operatively connected to the engine controller. The non-volatile memory stores values used by the engine controller to control operations of the printing engine.

Further, at least one adapter card is operatively connected to the non-volatile memory and to the actuators and sensors. The adapter card stores data and receives sensor feedback from the sensors. The adapter card uses the data and the sensor feedback to control the actuators by bypassing the engine controller when communicating with the actuators. The adapter card provides adapter card feedback to the non-volatile memory.

In another embodiment, the printing engine comprises sensors, first actuators, and second actuators. The first actuators correspond to a design of the controller, and the second actuators correspond to a design of the adapter card. The adapter card is operatively connected to the non-volatile memory and to the sensors and the second actuators, The adapter card stores data and receives feedback from the sensors and the adapter card uses the data and the feedback to control the actuators by bypassing the engine controller when communicating with the second actuators.

In an additional embodiment, the non-volatile memory stores values used by the engine controller to control operations of the printing engine. The adapter card reads incoming print jobs before the print jobs are delivered to the controller and the adapter card uses the print jobs to adjust the actuators in coordination with instructions from the engine controller.

The adapter card comprises a physically separate device from the engine controller. More specifically, the adapter card can comprise, for example, a printed circuit board, at least one logic unit mounted on the printed circuit board, wiring within the printed circuit board connected to the logic unit, and connection terminals on the printed circuit board connected to the wiring. The connection terminals can be operatively connected to the non-volatile memory.

The adapter card can be connected to the non-volatile memory through one of the following interfaces: TCP/IP based web server interface; front panel keyboard wedge interface; service interface; direct hardwired connection; etc. Further, the adapter card comprises an item designed to be installed in the printing device after the printing device is in post production, customer service. This also covers the case of sourcing a third party engine, then adding the adapter card to enable delivery of value-add solutions without the update of the existing engine controller or system software.

These and other features are described in, or are apparent from, the following detailed description.

BRIEF DESCRIPTION OF THE DRAWINGS

Various exemplary embodiments of the systems and methods are described in detail below, with reference to the attached drawing figures, in which.

DETAILED DESCRIPTION

Figure 1:
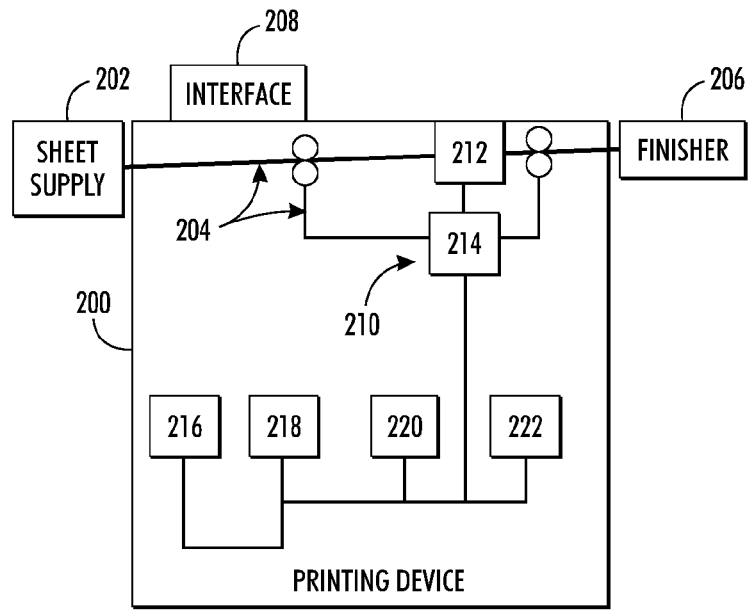
FIG. 1 is a schematic diagram of a printing device according to embodiments herein.

Referring now to FIG. 1, embodiments herein include a printing device 200 that has at least one printing engine 210 that is at least partially made up of customer replaceable units (CRU) 212/214. The customer replaceable units or modules 212/214 can comprise, for example, photoreceptors, fusers, drums, rollers, toner cartridges, ink cartridges, etc., and are items that are usually replaced by either a customer or an end user (and do not require the services of a trained service technician). Customer replaceable units are items that are well-known to those ordinarily skilled in the art (for example, see U.S. Pat. Nos. 7,146,112 and 7,529,491, the complete disclosures of which are incorporated herein by reference) and are available from manufacturers such as Xerox Corp., Norwalk Conn., USA. Therefore, a detailed discussion of such customer replaceable units is not included herein so as to focus the reader on the salient features of the disclosed embodiments.

At least one engine controller 216 is operatively connected to the printing engine 210. The engine controller 216 uses software, potentially stored in a memory device (magnetic storage medium, etc.) 222, to control the operations of the printing engine 210. Engine controllers and printing devices are items that are well-known to those ordinarily skilled in the art (for example, see U.S. Pat. No. 7,237,771 the complete disclosure of which is incorporated herein by reference) and are available from manufacturers such as Xerox Corp., Norwalk Conn., USA. Therefore, a detailed discussion of such items is not included herein so as to focus the reader on the salient features of the disclosed embodiments.

In addition, the printing device 200 includes an interface or digital front end (DFE) 208 that can comprise a scanner, a graphic user interface, network connections, TCP/IP serial communication, front panel keyboard, or direct connection, and/or other input output connections. Incoming print jobs are sent to the engine via the interface 208. The interface 208 raster image processes (RIPS) the job and sends it to the engine controller 216 to be imaged onto the photoreceptor (212/214), transferred, and finally fused to the sheets of media (substrate). The printing device 200 draws sheets of media from the sheet supply 202 and utilizes a paper path 204 to feed the sheets through the printing engine 210. A finisher unit 206 can process the sheets after they have been printed by stapling, binding, folding, etc., the sheets.

At least one non-volatile memory 218 is operatively connected to the engine controller 216. The non-volatile memory 218 stores values used by the engine controller 216 to control operations of the printing engine 210. At least one adapter card 220 is operatively connected to the non-volatile memory 218 and to the customer replaceable units 212/214. The lines between the units shown in FIG. 1 can comprise wires or wireless connections, such as radio frequency identification (RFID) wireless communication connections. The adapter card 220 is shown in greater detail in FIG. 2 and comprises a physically separate device from the engine controller 216.

Figure 2:
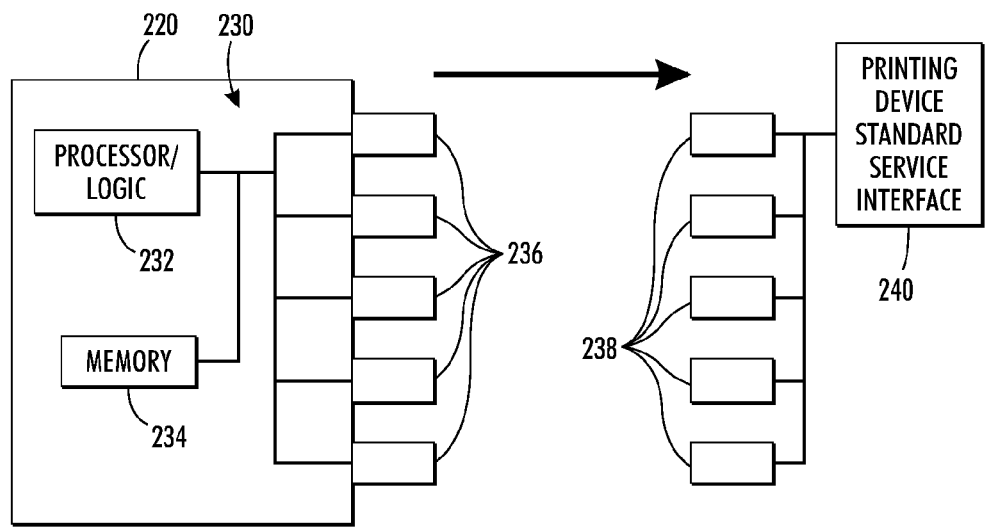
FIG. 2 is a schematic diagram of an adapter card according to embodiments herein.

Referring to FIG. 2, the adapter card 220 comprises a separate printed circuit board 230 and at least one processor or logic unit 232 mounted on the printed circuit board 230. A memory unit 234 can also be attached to the printed circuit board 230. Wiring is present within the printed circuit board 230 and is connected to the processor 232 and memory 234. Connection terminals 236 on the printed circuit board 230 are connected to the wiring. As would be understood by those ordinarily skilled in the art, other items such as electrostatic discharge circuitry, various capacitors, resistors, etc., would be included within the adapter card 220; however, such structures are intentionally not illustrated in FIG. 2 in order to simplify the drawings.

The connection terminals 236 connect to corresponding connection terminals 238 of the printing device. The printing device connection terminals 238 are connected to the wiring within the printing device 200. Therefore, the adapter card connection terminals 236 are operatively (indirectly) or directly connected to the non-volatile memory 218 and to the customer replaceable units 212/214.

For example, the printing device connection terminals 238 can be wired into the printing device standard service interface 240 that service engineers connect to when reprogramming the values within the non-volatile memory 218. This allows the adapter card 220 to perform the same activities that could be performed by a service engineer, without requiring a service call. The printing device standard service interface 240 could be, in some embodiments, part of the interface 208 illustrated in FIG. 1, or could be a separate structure.

Alternatively, the printing device connection terminals 238 could be directly wired to the non-volatile memory 218 or could be wired to the any other access point or controller that would allow access to the non-volatile memory 218. Further, the printing device connection terminals 238 are connected to the systems within the printing device 200 that read and maintain the data from the customer replaceable unit's memory 212/214. (For details regarding such systems, see the previously mentioned U.S. Pat. No. 7,146,112).

At least one of the customer replaceable units (CRU) 212/214 has a memory unit (customer replaceable units 212) that stores information and data used by the machine (date produced, origin, country, etc.) and information that is recorded from the machine (machine print counts, paper sizes printed, pixel counts, etc.) that help the printing engine 210 operate properly, often through an RFID interface. The non-volatile memory 218, the memory units within the customer replaceable units 212/214, and the memory unit 234 can comprise any type of computer readable storage medium including a non-volatile memory, random access memory, a permanent storage medium (magnetic, optical, etc.).

The data maintained within the memory of the customer replaceable units 212/214 changes as the design of the customer replaceable units 212/214 are updated and improved over time. This data and information may be different than the information that was available when the printing device 200 was originally manufactured. Therefore, when a customer replaces one of the customer replaceable units 212/214, the customer not only replaces a consumed or worn out component, the customer also updates the information provided to the printing device 200 to help it continue to operate at peak performance and fully utilized the design updates and advances that may have been made to the customer replaceable units 212/214.

Some of the updates included within the memory of the customer replaceable units 212/214 can require changes to the non-volatile memory 218; however, if the customer replaceable units 212/214 are manufactured by a different organization than the manufacturer of the printing device 200 and/or the manufacturer of the engine controller 216, the information within the customer replaceable unit may be in an incompatible format for the controller 216 to utilize. Therefore, the adapter card 220 is configured to bypass the controller 216 and directly alter the non-volatile memory 218. This allows the adapter card 220 to alter the non-volatile memory 218 without having to alter the software used by the engine controller 216 and without requiring the expertise of a trained service engineer.

The adapter card 220 reads data from the memory unit that resides with the customer replaceable unit. The adapter card 220 uses the data to directly alter values within the non-volatile memory 218 (even if the software used by the engine controller 216 is non-compatible with the data within the memory unit) by bypassing the engine controller 216 when communicating with the non-volatile memory 218.

Figure 3:
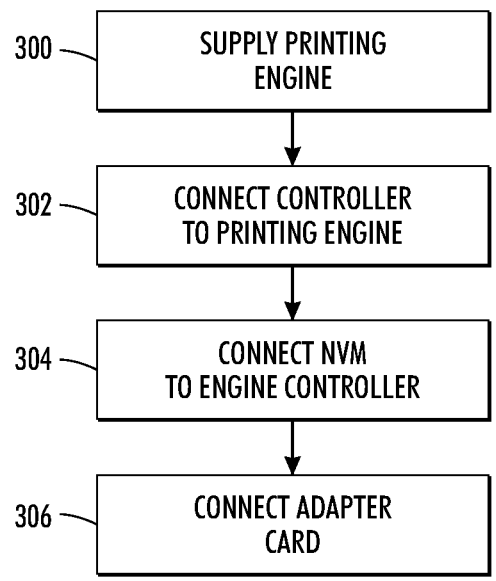
FIG. 3 is a flow diagram illustrating method embodiments herein.

As shown in flowchart form in FIG. 3, one exemplary manufacturing method embodiment herein begins in item 300 by supplying the aforementioned printing engine 210 that has the customer replaceable units 212/214. In item 302, the method connects the engine controller 216 to the printing engine 210 and, in item 304, connects the non-volatile memory 218 to the engine controller 216. In item 306, the method also connects the adapter card 220 to the non-volatile memory 218 and to the customer replaceable units 212/214.

Figure 4:
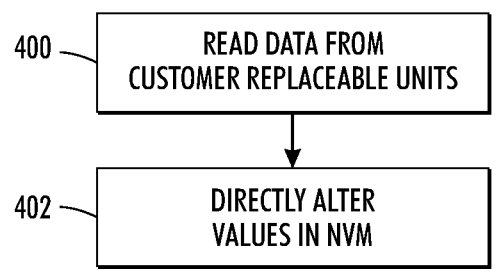
FIG. 4 is a flow diagram illustrating method embodiments herein.

As shown in flowchart form in FIG. 4, in an operational example, according to one method herein (in item 400) the adapter card 220 reads data from the memory unit within one of the customer replaceable units 212/214, and in item 402 the adapter card 220 uses the data to directly alter values within the non-volatile memory 218 by bypassing the engine controller 216 when communicating with the non-volatile memory 218.

Figure 5:
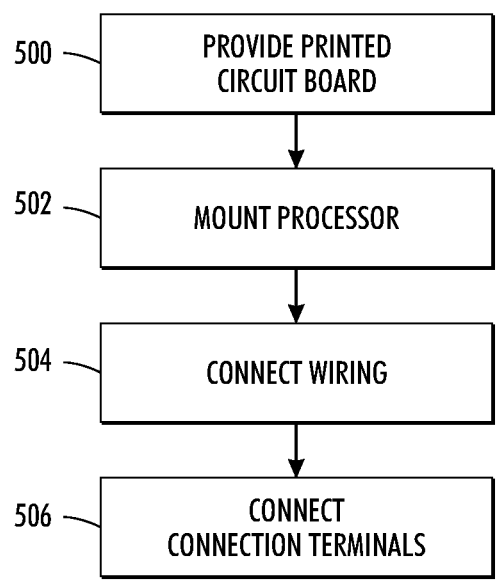
FIG. 5 is a flow diagram illustrating method embodiments herein.

FIG. 5 illustrates, in flowchart form, that the method embodiments herein further comprise a manufacturing method for the adapter card 220. This process comprising providing the printed circuit board 230 (item 500); mounting at least one processor 232 on the printed circuit board 230 (item 502); connecting the wiring within the printed circuit board 230 to the processor 232 (item 504); and connecting the connection terminals 236 on the printed circuit board 230 to the wiring (item 506).

Figure 6:
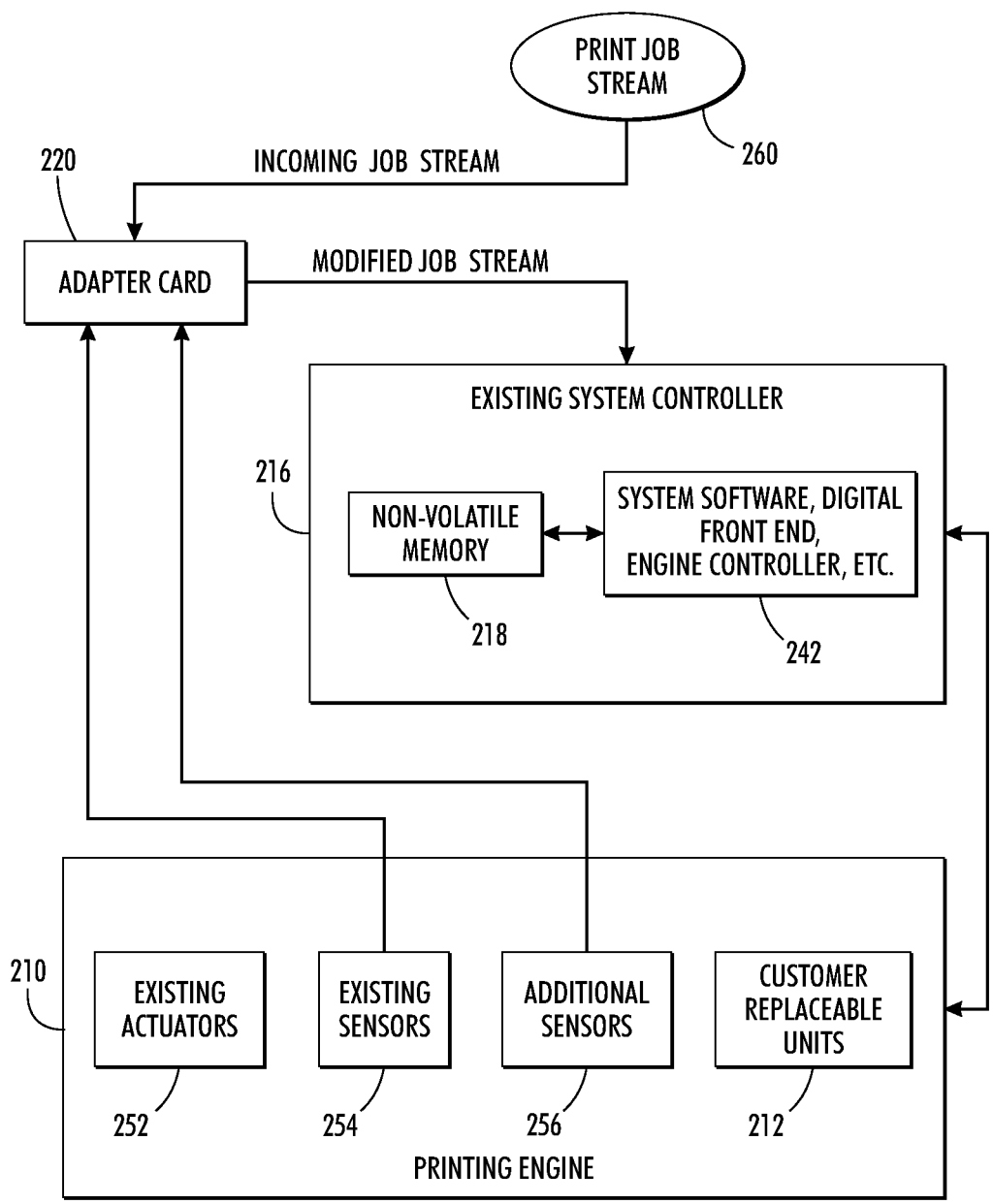
FIG. 6 is a schematic diagram of a printing device according to embodiments herein.

As shown in FIG. 6, additional embodiments herein comprise a portion of the printing device 200 that includes at least one printing engine 210 that has many sensors (first sensors 254, second sensors 256, etc.). The sensors can comprise existing sensors 254 that are original equipment of the printing device 200 and additional sensors 256 that are added to the printing device 200 after the printing device 200 has been post-original manufactured. The first sensors 254 correspond to the design of the controller 216 and are items designed as original equipment of the printing device. To the contrary, the second sensors 256 correspond to the design of the adapter card and are items designed to be installed in the printing device after the printing device is in post production, customer service. For example, the additional sensors 256 can be added at the same time that the adapter card 220 is added to the post-original manufactured printing device 200. These items could be installed in the printing device 200 even after the printing device 200 has been in service in the field for an extended period of time.

In these embodiments also, at least one engine controller 216 is operatively connected to the printing engine 210. Again, the engine controller 216 uses software to control operations of the printing engine 210. At least one non-volatile memory 218 is again operatively connected to the engine controller 216. The non-volatile memory 218 stores values used by the engine controller 216 to control operations of the printing engine 210.

Note that in FIG. 6, and the other drawings, not all connections are shown to avoid clutter in the drawings. For example, connections between the controller 216, the actuators 252, 254, the customer replaceable units 212, etc., are shown by a single connection line to avoid clutter. Similarly, connections to the non-volatile memory 218, system software, digital front end, engine controller 242, etc., are understood to be included within the single major component lines illustrated. In other words, it would be understood by one ordinarily skilled in the art that the existing actuators 252, existing sensors 254, customer replaceable units 212, etc., are connected to the existing system controller 216 and such individual connections are not illustrated in the drawings to avoid clutter.

With embodiments herein at least one adapter card 220 is operatively connected to the non-volatile memory 218 and to the first sensors 254 and second sensors 256. The adapter card 220 receives feedback from the first sensors 254 and the second sensors 256 and the adapter card 220 reads and modifies incoming print jobs from the print job stream 260 before the print jobs are delivered to the controller 216. Therefore, in the embodiment shown in FIG. 6, the incoming job stream from the print job stream 260 is intercepted and altered by the adapter card 220 depending upon the readings from the existing sensors 254 and the additional sensors 256. Then, the adapter card 220 outputs a modified job stream to the controller 216, which executes the modified job stream to complete each print job.

An example of the use of such an embodiment is as follows. The adapter card 220 submits a streak calibration print job. A full width array sensor within the engine can measure the streaks on the streak calibration prints. The adapter card 220 then processes the streak calibration data and produces a streak compensation. Following this, a customer print job can be submitted. As mentioned above, the adapter card 220 intercepts the print job and applies the streak compensation to the print job. The adapter card 220 then provides the modified print job to the print engine and the print job is produced. Other similar control loops are possible using the adapter card 220 (tone reproduction curve control, banding compensation, ghosting, halo, etc.) depending on the sensor involved and the characteristics of the defect. Using the embodiment shown herein, the original equipment manufacturer (OEM) print engine system software does not need to be modified, nor does the OEM print engine system software need to inherently support the desired sensor data analysis and image compensation processing.

The additional sensors 256 capture information that was not contemplated for use according to the design of the existing system controller 216, but the additional sensors 256 capture data that is used by the adapter card 220. For example, it may be found that with additional information from new areas of the printing engine 210, the performance of the printing engine 210 may be improved. Therefore, the adapter card 220 (in combination with the added sensors 256) allows the existing system controller 216 to achieve higher performance levels by measuring and acting on newly acquired data and information that was not considered necessary (that was not needed) when the existing system controller 216 was designed and manufactured.

Further, the additional sensors 256 can correspond to the updated design of newly manufactured customer replaceable units 212. For example, the customer replaceable units 212 may have a new design or use new materials that were developed after the original equipment customer replaceable units (and the existing system controller 216) were designed and manufactured (or that are different than the original equipment manufacturer's design). Such newly manufactured/designed customer replaceable units may increase the performance of the printing engine 210, but may need different control instructions from the controller. Therefore, the additional sensors 256 can be specifically designed to obtain information that relates to maximizing the performance of the new or different designs of the customer replaceable units.

Thus, the incoming job stream from the print job stream 260 is intercepted and altered by the adapter card 220 depending upon the reading from the existing sensors 254 and the additional sensors 256 to take advantage of new or different designs/materials that newly designed components 212 may offer, so as to improve the performance of the printing engine 210.

Figure 7:
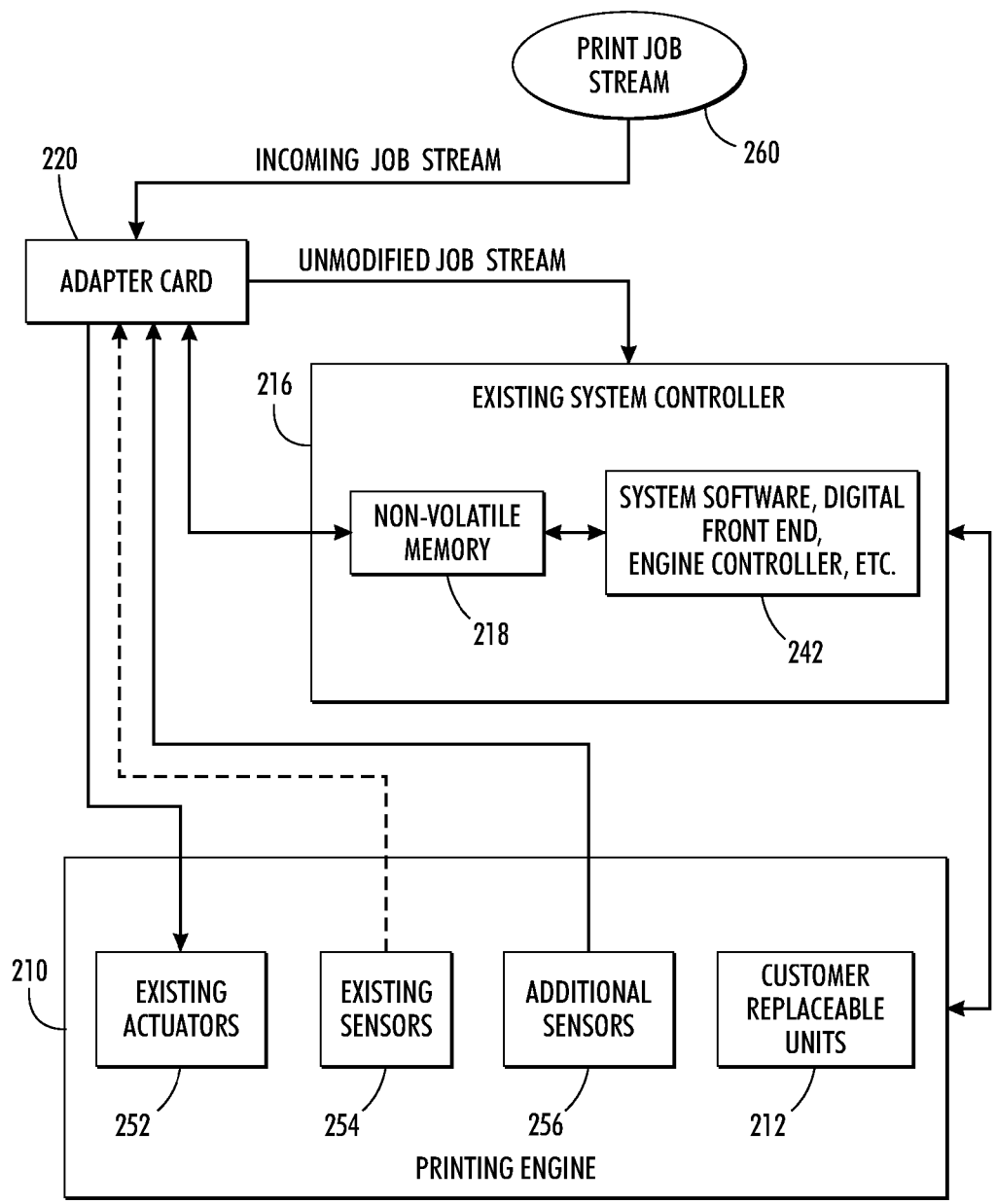
FIG. 7 is a schematic diagram of a printing device according to embodiments herein.

In another embodiment, shown in FIG. 7, the adapter card 220 stores data and receives sensor feedback from the second sensors 256, the adapter card 220 uses the data and the sensor feedback to control the actuators by bypassing the engine controller 216 when communicating with the actuators. The adapter card 220 can also receive sensor data from the existing sensors 254. Further, the adapter card 220 provides adapter card 220 feedback to the non-volatile memory 218.

Thus, in the embodiment shown in FIG. 7, the adapter card can replace or partially replace the functions of the existing system controller 216 by receiving at least a copy of the incoming print jobs from the print job stream 260, interacting with the non-volatile memory 218, and altering the settings of the existing actuators 252 within the printing engine 210. When interacting with the existing actuators 252, the adapter card 220 can provide settings to the actuators that are not necessarily consistent with the settings that the existing system controller 216 would provide; however, such new settings provided by the adapter card 220 can improve the performance of the printing engine 210. This allows the adapter card 220 to utilize advances that may have occurred after the existing system controller 216 was designed and that may only be available because of the additional information provided by the additional sensors 256.

Thus, the embodiment shown in FIG. 7 enables deployment of new technologies to the field for improved machine performance with no upgrade of the system software required. In addition, there is no special requirement on the system software to support this upgrade functionality. Most engines already support adjustment of the non-volatile memory settings through at least one interface with the external world. The present invention places a smart box (the adapter card 220) within the engine to enable such non-volatile memory upgrades. The system software does not need to be changed at all to enable the adapter card 220.

The adapter card 220 provides a feasible path for retrofitting new additional sensors into existing engines to enable significant upgrades in engine performance. Without the adapter card 220, implementation of engine control changes requiring new additional sensors have proven to be very difficult. Thus, the adapter card 220 removes this barrier to improved engine performance.

Figure 8:
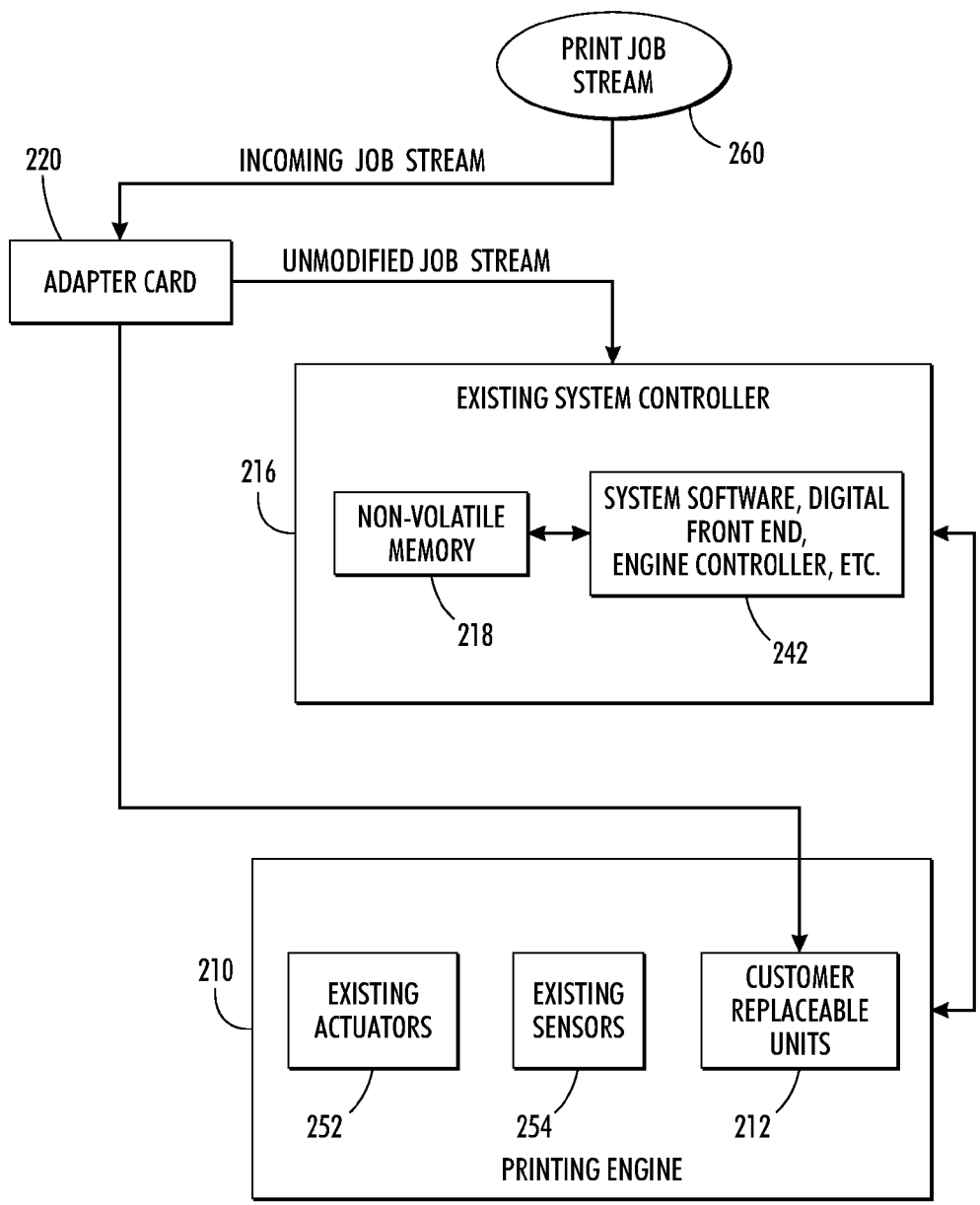
FIG. 8 is a schematic diagram of a printing device according to embodiments herein.

In another embodiment, shown in FIG. 8, the adapter card 220 reads incoming print jobs before the print jobs are delivered to the controller 216 and the adapter card 220 accumulates and stores statistics relating to print jobs within the memory 218 unit of the customer replaceable units. The statistics can comprise, for example, area coverage on a page-by-page basis, localized pixel counts (in both dimensions), maximum number of layers used per page, area coverage spread (concentrated in one region versus across the entire page) per page, media type, job lengths, machine usage as a function of time of day, etc. In the embodiment shown in FIG. 8, the adapter card 220 passes the incoming print jobs to the controller 216 in an unaltered manner.

As is known by those ordinarily skilled in the art, the customer replaceable units 212 are typically returned to the manufacturer for refurbishing (are recycled). During such refurbishing, with the embodiment shown in FIG. 8, the various statistics can be downloaded from the memory within the customer replaceable units 212. This allows the manufacturer to utilize the statistics to understand the customer usage of the printing device 200, which allows the manufacturer to improve the performance of the customer replaceable unit and of the printing device itself. Such statistics can also help the manufacturer create new designs that may be more appropriate considering the actual types of print jobs that are being processed through the printing device 200.

The embodiment shown in FIG. 8 is minimally intrusive but dramatically enhances the manufacturer's capability to obtain extended information about customer usage, without requiring changes to the existing system software to do so. While data logging via network connections can obtain similar information, such network solutions are not always well received by many customers due to security concerns. This embodiment provides a means of acquiring the same data, without any customer intervention or approval requirements.

The data storage capacity of the customer replaceable units may sometimes be limited. Therefore, the image/job analysis performed by the adapter card 220 reduces the data to key information (usage counters, etc) rather than storing the entire job stream of images. In addition, the adapter card 220 enables customer replaceable units 212 data logging of information that may not have been foreseen at print engine design time. For example, a newly developed (after print engine launch) customer replaceable unit may include a new cleaning blade. Engineers may desire customer replaceable units 212 data logging of a counter for: minimum pixel count in cross-process direction, which is a new requirement, unforeseen when the print engine with its original customer replaceable units was developed. Without the adapter card 220 a new print engine system software version would be required, which can take significant time, effort, and cost. Thus, the embodiment shown in FIG. 8 enhances the value add path for technology injections through advanced customer replaceable units, some of which many even be implemented after printer engines are in the field. The ability to add capability unforeseen at design time is one benefit provided by the embodiments herein.

Figure 9:
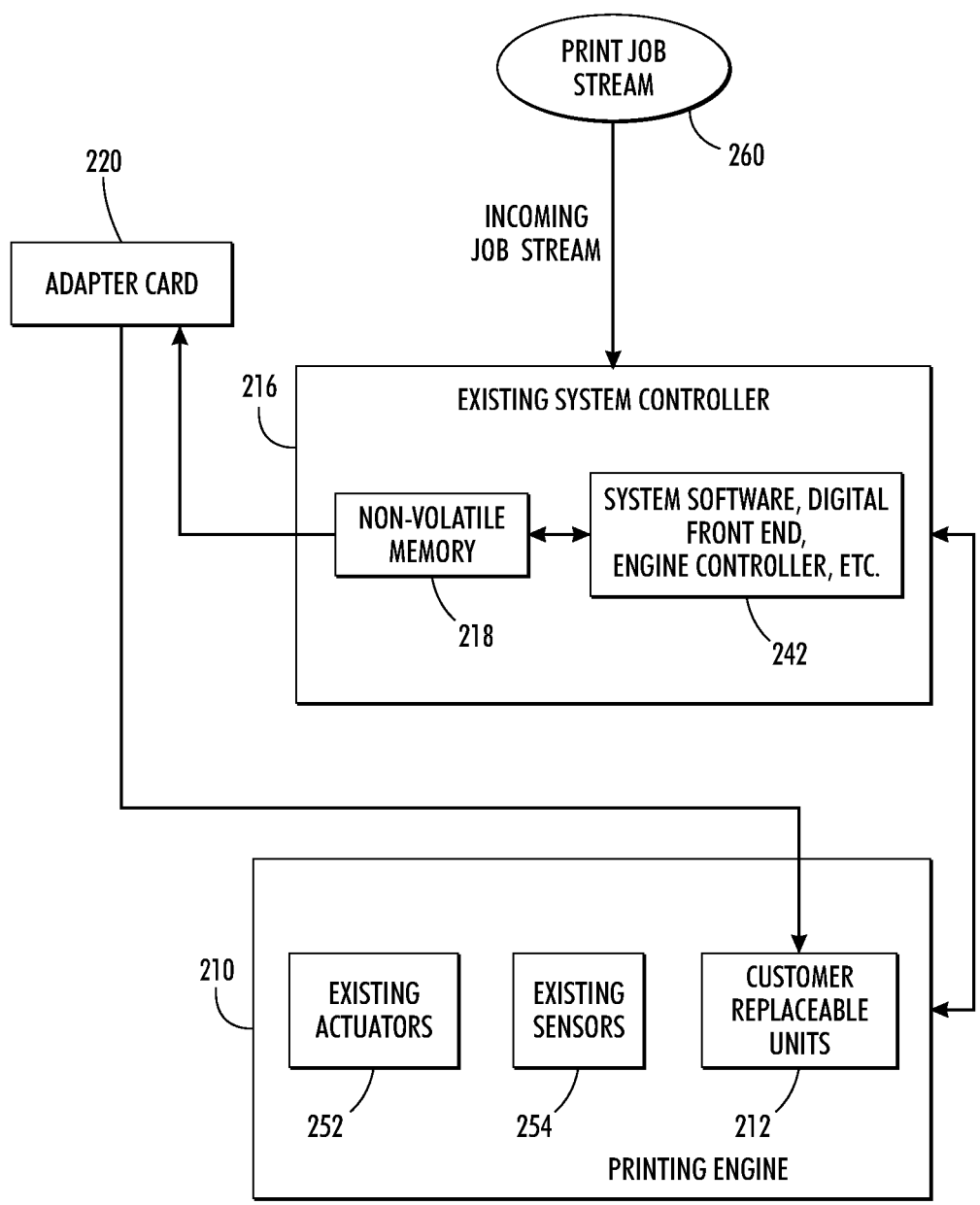
FIG. 9 is a schematic diagram of a printing device according to embodiments herein.

FIG. 9 illustrates an additional embodiment. As mentioned above, the non-volatile memory 218 stores values used by the engine controller 216 to control operations of the printing engine 210. In the embodiment shown in FIG. 9, the adapter card 220 reads these values from the non-volatile memory 218 and the adapter card 220 stores the values within the memory unit of the customer replaceable units 212. Then, when the customer replaceable units 212 are refurbished by the manufacturer, the values within the non-volatile memory 218 can be utilized to improve the printing operations of the printing device 200.

In the embodiment shown in FIG. 9, the adapter card 220 module reads various non-volatile memory 218 locations, at a selectable interval, and writes this information to one (or several) of the customer replaceable units 212 in the printer. This information can then be used during the post-mortem analysis of these replaceable components to better understand how the printer is performing over time and how sensing and actuator values are changing within the printer under actual customer operating conditions. The types of information that are captured include the daily print count, process control patch densities, charge grid voltage, electrostatic voltmeter readings, toner concentration (TC) setpoints, temperature and relative humidity (RH) readings, etc. This information can be post-processed from the customer replaceable units 212 and used to provide engineering teams extremely useful information to help develop improved products or enhance current ones. The adapter card 220 module can be added before the machine is delivered to the customer or even after delivery, as a field upgrade kit, providing a method to read and record important non-volatile memory 218 locations over the machine's life without any service engineer intervention.

The type of information that can be gathered by the adapter card 220 is illustrated in the following examples. For example, the adapter card 220 can write daily print counts into customer replaceable units 212 to provide a breakdown throughout the month of customer job distributions (daily load). In addition, the adapter card can periodically read print count and density sensor patch readings from non-volatile memory 218 and log such information to the customer replaceable units 212. This gives a time history (though incomplete) of the mass sensor data that is not typically available. Also, the adapter card can periodically read print count and temperature and RH sensor readings from non-volatile memory 218 and log the same to the customer replaceable units 212. This gives a time history (though incomplete) of the environmental sensor data that is not typically available.

Figure 10:
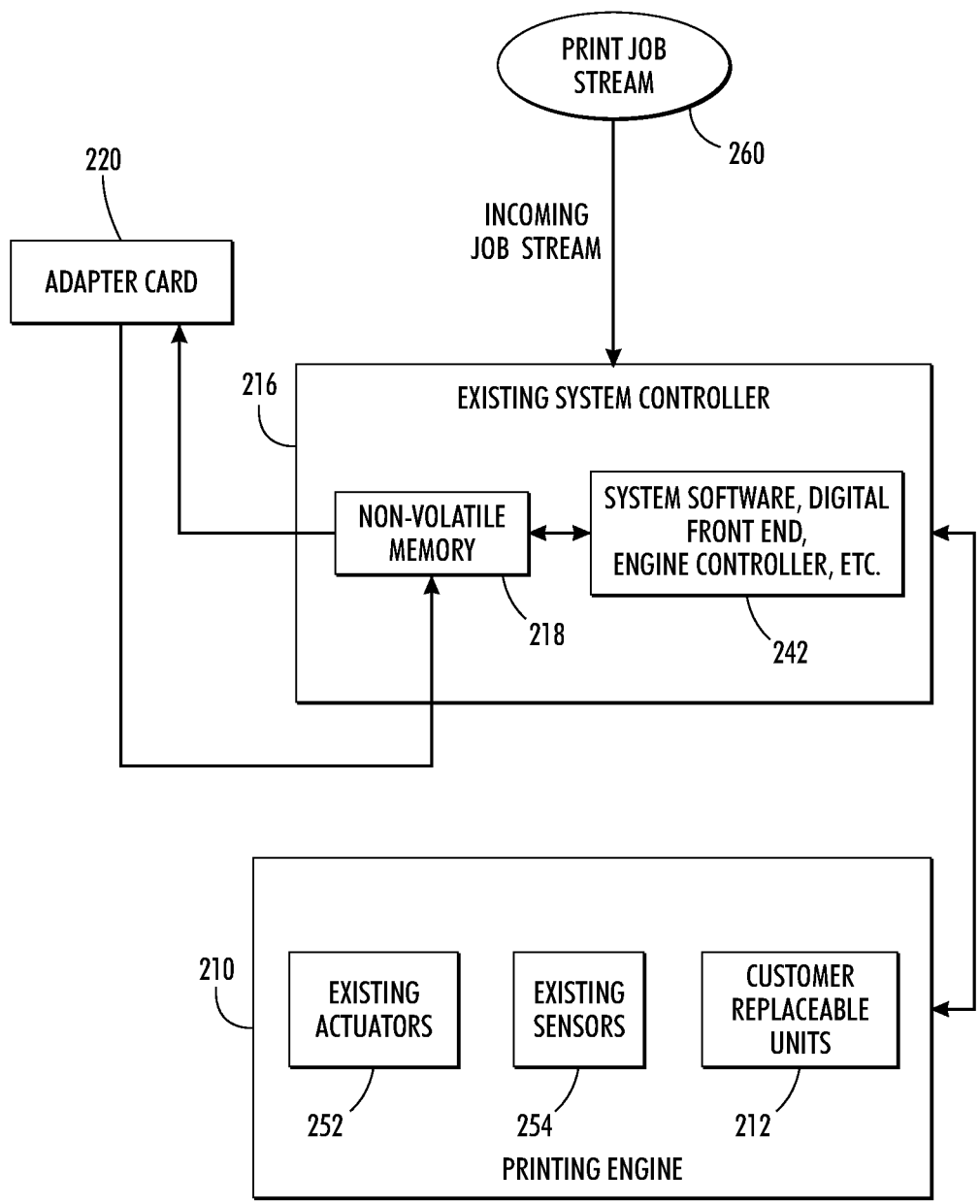
FIG. 10 is a schematic diagram of a printing device according to embodiments herein.

In a different embodiment, shown in FIG. 10, the non-volatile memory 218 stores values used by the engine controller 216 to control operations of the printing engine 210 and the adapter card 220 also stores new data. The adapter card 220 uses the new data to alter the values within the non-volatile memory 218 by bypassing the engine controller 216 when communicating with the non-volatile memory 218. This allows the adapter card 220 to alter the values within the non-volatile memory 218 according to conditions that are observed by the adapter card 220 when it reads information from the non-volatile memory 218. For example, the adapter card 220 may recognize a data condition within the non-volatile memory 218 that produces sub-optimal printing conditions, and in response to this the adapter card 220 may replace some portions of the non-volatile memory 218 with new data which improves printing performance.

Thus, as shown in FIG. 10, this embodiment reads and writes to various non-volatile memory locations to enable closed loop control. The adapter card 220 reads input or sensor non-volatile memory locations and uses that data as feedback to make controlled adjustment to output or actuator non-volatile memory locations. This provides closed loop control of the printing engine 210 without any system software modification. Typical feedback type non-volatile memory locations can contain, for example, data on temperature, RH, density readings, electrostatic voltage data, print count, etc. Typical actuator type non-volatile memory 218 locations might contain grid voltage level, BCR (biased charging roll) AC current level, BCR DC voltage level, development bias, fuser lamp power, etc.

The adapter card 220 module can be added before the machine is delivered to the customer or even after delivery, as a field upgrade kit, providing a method to read and write to important non-volatile memory locations over the machine's life without any service engineer intervention.

Typical applications of the embodiment shown in FIG. 10 can include adjustment of BCR DC voltage based on print count, using a different algorithm than the standard OEM algorithm; adjustment of BCR cleaner engagement rate based on print count to enable enhanced BCR life by minimizing abrasion related failures; reading temperature and RH data from non-volatile memory 218 and adjusting BCR Vpp (peak-to-peak AC voltage) through non-volatile memory 218 to avoid LCM (lateral charge migration) defects in certain environmental operating conditions (e.g. A-zone). This enables optimal (minimized) photoreceptor wear based on actual operating conditions (rather than forcing higher wear to avoid defects that only occur in A-zone).

Note that the adapter card 220 enables implementation of a non-volatile memory 218-to-non-volatile memory 218 adjustment methodology that was unforeseen at print engine development and manufacture time. In addition, the embodiments herein enable field upgrades of adjustment algorithms that may support optimized performance of a new customer replaceable unit. For example the adaptor card could make adjustments to NVM locations corresponding to process control gains for existing control algorithms in the system controller 216. By using the adapter card 220, no print engine system software needs to be modified.

Figure 11:
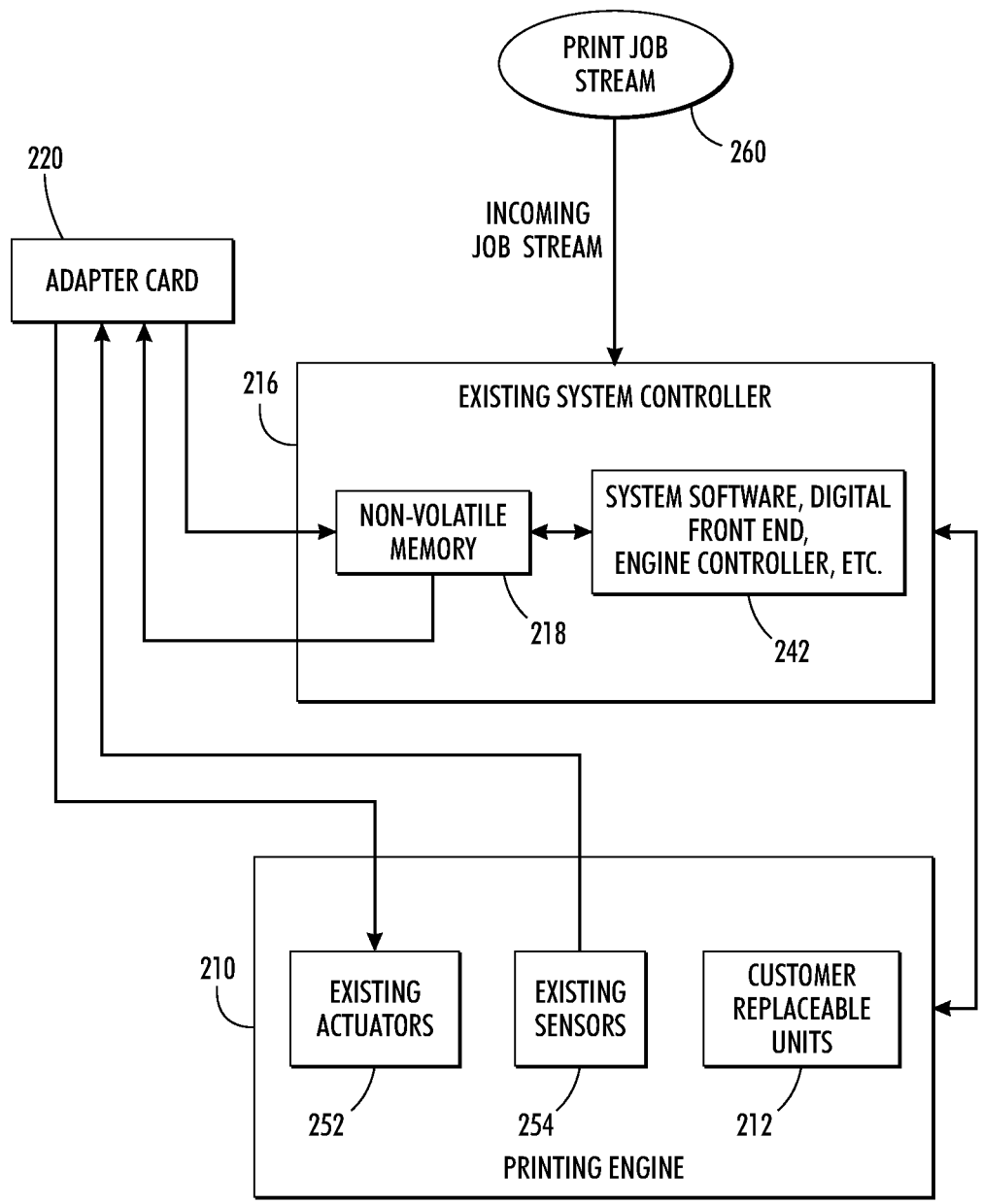
FIG. 11 is a schematic diagram of a printing device according to embodiments herein.

In another embodiment, shown in FIG. 11, the adapter card 220 stores data and receives sensor feedback from the existing sensors 254. The adapter card 220 uses the data and the sensor feedback to control the existing actuators 252 by bypassing the engine controller 216 when communicating with the actuators. The adapter card 220 also provides adapter card 220 feedback to the non-volatile memory 218.

Therefore, with the embodiments shown in FIG. 11, the adapter card 220 adjusts the values within the non-volatile memory 218 based on feedback from the sensors 254 within the printing engine 210. This also allows the adapter card 220 to adjust the existing actuators 252 so as to improve printing performance.

As shown in FIG. 11, the adapter card 220 reads existing sensors within the machine and modifies control actuations that are generated by the existing system controller for the printer. Using this approach the system software does not need to be modified, nor does it need to inherently support the desired alterations as part of its design, but value-add solutions which would typically require special system software can still be implemented. This embodiment focuses on the use of sensors and actuators outside of non-volatile memory 218 and customer replaceable units 212 settings. Although this is slightly more intrusive than some of the other embodiments mentioned herein, in order to enable acquisition of the required hardware signals, the approach of the present embodiment also enables a great deal more capability in terms of the types of control algorithms that can be implemented. Further, the present embodiment uses existing sensors and actuators within the printing engine 210, beyond the system non-volatile memory 218 parameters, for enabling value-add control technology injections.

There are a number of ways that could be used to enable access to the required sensor and actuator signals in the printer. For the sensor signals, it would typically be possible to modify the existing wiring harness in the machine (e.g. double-crimping additional wires to the leads of the sensor). For the actuators, it is often critical to ensure that the existing system controller still have access to these same adjustment mechanisms. This can be achieved in a number of ways. For example, the adapter card 220 actuation can simply be added to the existing system controller's actuation using a hardware summing circuit. This type of approach has been demonstrated in the past for use in modifying the raster output scanner power setting as part of certain banding compensation strategies.

Although the proposed control implementations do require some degree of hardware modification to gain access to the desired sensor and actuator signals, these modifications would typically be relatively minor. These modifications could easily be done as field-retrofits to existing machines in the field, or just prior to shipment as part of the printing engine sourcing process. Such minor hardware modifications are simple in comparison to requiring changes to the system software for a print engine. The embodiments herein therefore implement a parallel controller to the existing engine software, without requiring any modifications to the printer's software. This add-on module provides the platform to enable a variety of value-add closed loop control technology injections.

Figure 12:
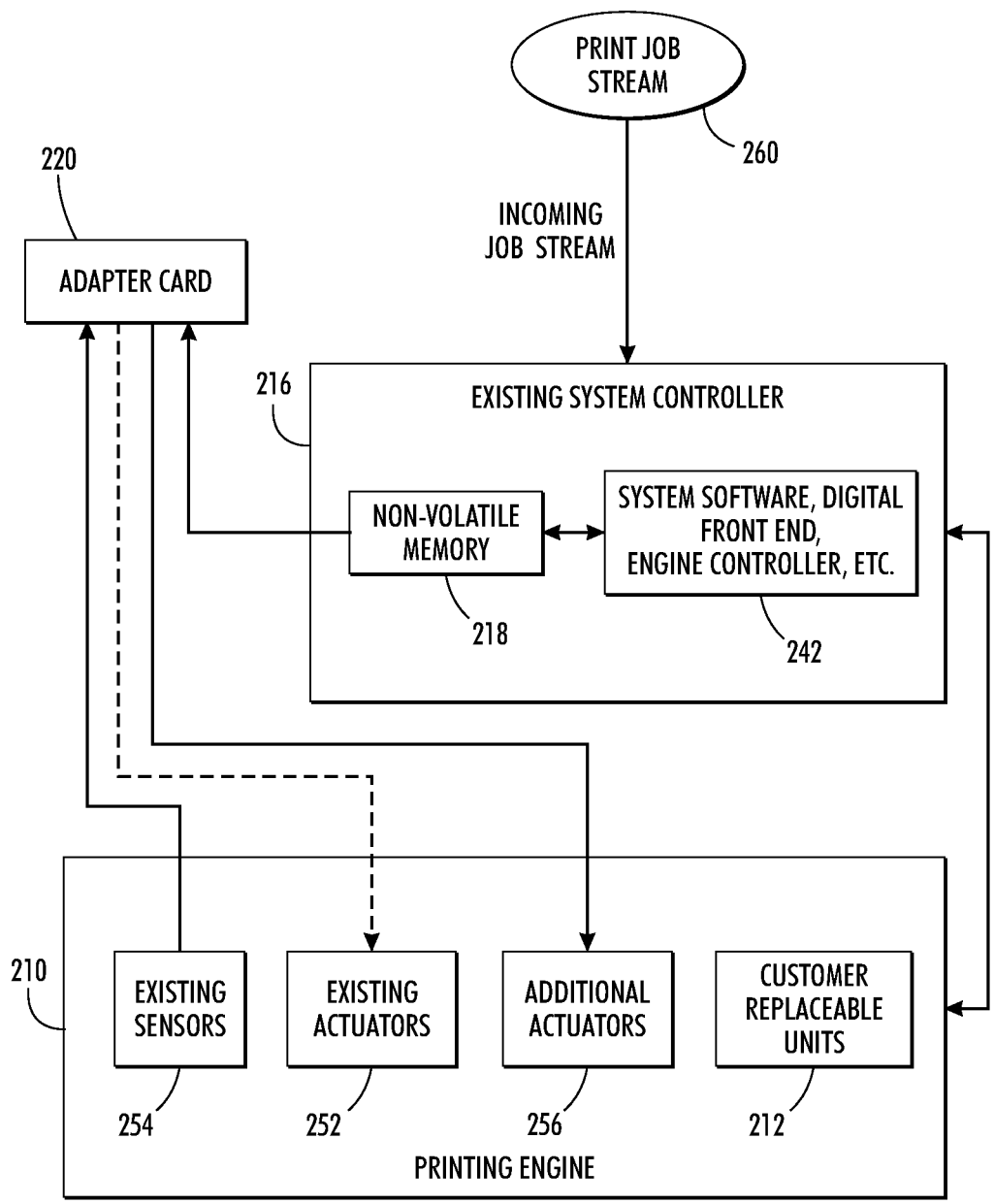
FIG. 12 is a schematic diagram of a printing device according to embodiments herein.

In another embodiment, shown in FIG. 12, the printing engine 210 comprises existing sensors 252, existing (first) actuators 254, and additional (second) actuators 258. The first actuators 254 correspond to a design of the controller 216, and the second actuators 258 correspond to a design of the adapter card 220. The adapter card 220 stores data and receives feedback from the sensors. The adapter card 220 uses such data and the feedback to control the actuators 254, 258 by bypassing the engine controller 216 when communicating with the actuators 254, 258. As would be understood by one ordinarily skilled in the art, the adapter card 220 can adjust the actuators 254, 258 in conjunction with input from the existing system controller 216 or completely separately from the existing system controller 216.

The adapter card 220 also directly actuates the new additional engine actuators. The printing apparatus 200 is physically modified to mount the adapter card 220 and new additional actuators 258 as well as to wire the adapter card 220 to non-volatile memory 218 through the engine controller, to new additional actuators 258 and to existing sensors 252.

Printing machines retrofitted with an adapter card 220 and new additional actuators 258 enable deployment of new technologies to the field for improved machine performance with no upgrade of the system software required. In addition, there is no special requirement on the system software to support this upgrade functionality. In many cases the adapter card 220 actuates the new additional actuators 258 independently of the machine controller 216. In some cases the new additional actuators 258 may need to be actuated in concert with existing machine actuators 254. In these cases the existing actuators 254 can be actuated by modifying non-volatile memory 218 locations. Alternatively, the existing actuators 254 can be wired to the adapter card 220. Most engines already support adjustment of the non-volatile memory 218 settings through at least one interface with the external world. The present embodiment places a smart box (the adapter card 220) within the printing engine 200 to enable such non-volatile memory 218 upgrades without any required contact with the external world. The system software does not need to be changed to enable the adapter card 220.

The adapter card 220 provides a feasible path for retrofitting new additional actuators into existing engines to enable significant upgrades in engine performance. Without the adapter card 220, implementation of engine control changes requiring new additional actuators have proven to be very difficult. The adapter card 220 removes this barrier to improved engine performance through delivery of value-add technology injections.

Figure 13:
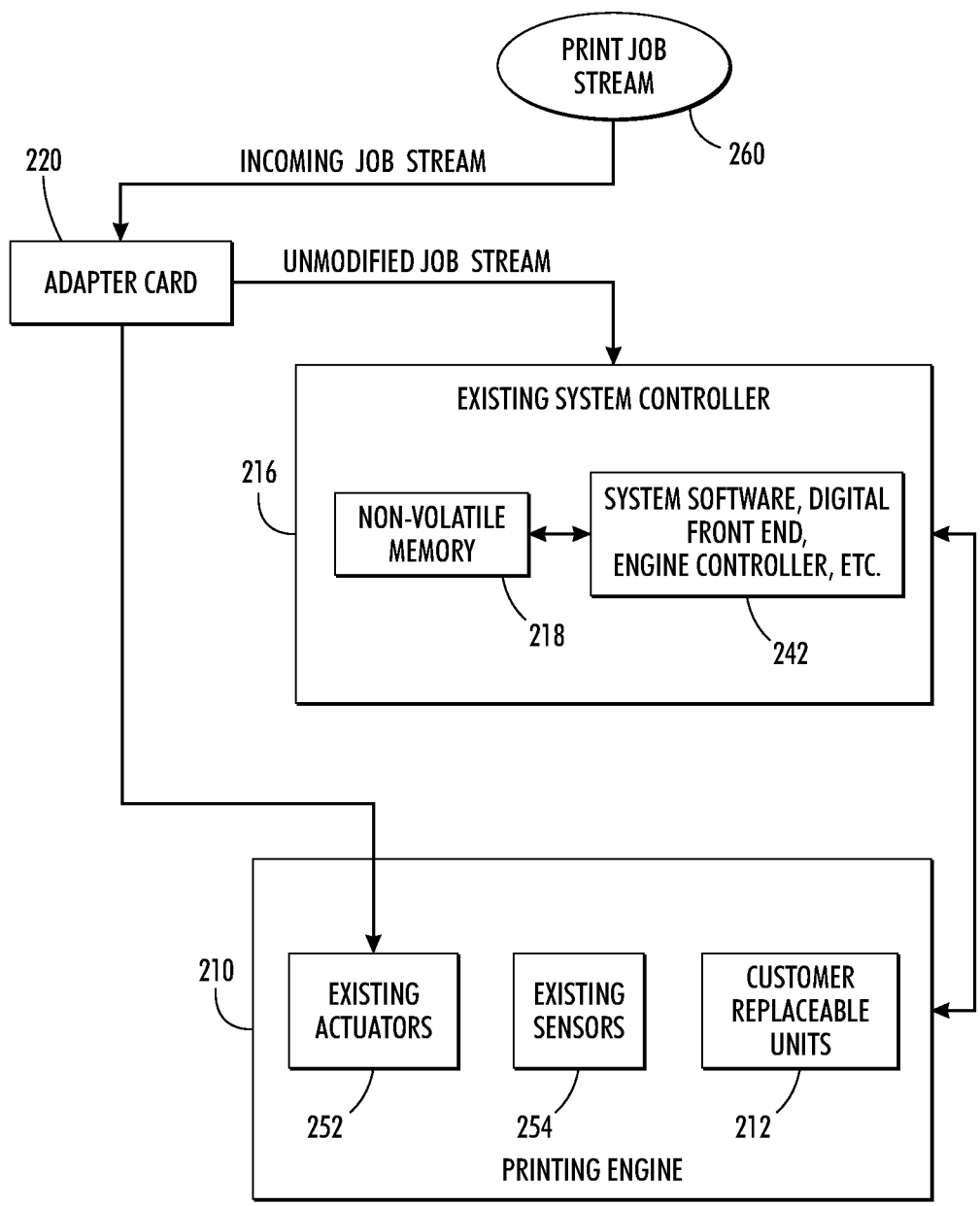
FIG. 13 is a schematic diagram of a printing device according to embodiments herein.

In an additional embodiment, shown in FIG. 13, the adapter card 220 reads incoming print jobs before the print jobs are delivered to the controller 216 and the adapter card 220 uses the print jobs to adjust the actuators either independently or in coordination with instructions from the engine controller 216. Again, the incoming job stream is passed to the existing system controller 216 without modification as an unmodified job stream, as illustrated in FIG. 13. This embodiment permits corrected direct adjustment of the existing actuators 252 which bypasses the existing system controller 216. More specifically, the adapter card 220, permits alteration of the existing actuators 252 without complicated and expensive modifications to the printer's software.

In the embodiments herein, the adapter card 220 comprises a physically separate device from the engine controller 216. More specifically, the adapter card 220 can comprise, for example, a printed circuit board at least one logic unit mounted on the printed circuit board, wiring within the printed circuit board connected to the logic unit, and connection terminals on the printed circuit board connected to the wiring. The connection terminals can be operatively connected to the non-volatile memory 218, the existing actuators 252, the existing sensors 254, the additional sensors 256, the additional actuators 258, the customer replaceable units 212, etc. The adapter card 220 can be connected to such elements through one of the following interfaces: TCP/IP based web server interface; front panel keyboard wedge interface; service interface; direct hardwired connection; etc. Further, the adapter card 220 comprises an item designed to be installed in the printing device after the printing device is in post production, customer service.

The adapter card 220 is an inexpensive add-on board that provides a communication vehicle between the engine controller and the other components within the printing engine 210. The adapter card 220 reads a set of memory locations on the customer replaceable units 212, often through a radio frequency identification (RFID) interface, and modifies non-volatile memory 218 locations within the engine controller (potentially via TCP/IP, serial communication, front panel keyboard wedge, or direct connection) based on this information. Typically, the engine controller has the capability, as delivered from its manufacturer to modify non-volatile memory 218 by these protocols to enable the portable workstation software (PWS) that is used by the service engineers.

The adapter card 220 provides similar capability, without service engineer intervention or contact with the external world (i.e. network upgrade). When a cartridge 212/214 is installed into the machine, the adapter card 220 reads predefined memory locations that contain a non-volatile memory 218 location to modify and the new value to write to that location. The adapter card 220 then modifies values that reside in the non-volatile memory 218 within the engine controller so that the controller can modify the control algorithms based on the new non-volatile memory settings. This process is repeated every time a new customer replaceable unit is installed which provides a method of modifying the process control settings on a cartridge by cartridge basis without any service engineer intervention.

Such automated processing enables deployment of new technologies to the field in the customer replaceable units with no upgrade of the system software required. In addition, there is no special requirement on the system software to support this upgraded functionality and/or technology sets within the customer replaceable units. Most engines already support adjustment of the non-volatile memory settings through at least one interface with the external world. The present invention places a smart box (the adapter card 220) within the printing device to enable such non-volatile memory upgrades without any required contact with the external world. The system software does not need to be changed to enable the adapter card 220.

The adapter card 220 module can be added before the machine is delivered to the customer or even after delivery, as a field upgrade kit, providing a method to modify control settings and enable integration of hardware and materials changes that occur over the machine's life without any service engineer intervention. The adapter card also allows many different configurations of cartridge hardware to exist in the field at the same time, since each cartridge modifies machine non-volatile memory 218 regardless of what software version is loaded on the machine. The following is an example of the impact of the adapter card 220.

One hardware modification that can enable a reduction in run cost is the development of an overcoated photoreceptor. The photoreceptor has a 2-6 micrometer coating as the top layer which prevents wear and scratches that occur during the contact charging process in these machines. Typical photoreceptor wear for current devices is around 30 nanometers per thousand cycles, while the overcoat has shown to have 2-3 nanometers per thousand cycles. This enables a 3-4× improvement in the life of the customer replaceable units for the color stations. The machines in the field are designed to adjust the setpoints based on the thickness of the photoreceptor transport layer. The manufacturer develops an algorithm for these setpoint adjustments based on the wear rate of the photoreceptor that ships with the machine. In order to use a cartridge with the new overcoated photoreceptor, machine non-volatile memories need to be modified to account for the much lower wear rate of the overcoat. Prior to embodiments herein, this would have been done by a service call to modify the non-volatile memory 218 or download new software to the machine. This non-volatile memory change (service call) would be needed every time the customer switched from one type of photoreceptor to the other, making introduction of the over-coated photoreceptor a logistical nightmare to implement in the field.

However, with the adapter card 220 module installed in the machine, the adapter card 220 uses the customer replaceable units 212, often through an RFID interface, in the replaceable photoreceptor unit to determine which photoreceptor resides in that particular cartridge. The customer replaceable units 212 contains the non-volatile memory locations and the new non-volatile memory values, which the adapter card 220 reads, often through an RFID interface, and makes the required modifications to the machines non-volatile memory 218 to accommodate that particular photoreceptor device. This is done using the current TCP/IP, front panel keyboard wedge, direct connection, or serial port 240 that already exists on most engine controllers. In this case, the non-volatile memory locations that contain the coefficients for the setpoints that change based on photoreceptor wear are modified to provide the correct adjustments for the overcoated device. The adapter card 220 is used to determine which photoreceptor is in the cartridge and modifies the machine engine controller accordingly, every time the customer installs a new cartridge. This enables multiple cartridge configurations to exist, simultaneously, in the field. While the photoreceptor was used in this example, the concept can be used for any subsystem or device in the print engine 200.

The adapter card 220 enables hands-free modification of the machine controller, on a cartridge-by-cartridge basis, to allow for run cost or customer satisfaction improvements that occur over the product's lifetime. This allows the needed "hooks" in the machine architecture that outsourcing manufacturers do not enable when the machine is launched and provides a method of implementing improvements without costly field upgrades for each improvement initiative.

The embodiments herein enable the seamless deployment of value-add technologies into print engines for which one does not have direct control over the system software. Automated management of the non-volatile memory settings based on the customer replaceable units parameters enables non-volatile memory adjustment on a per-cartridge basis (thereby allowing cartridges of mixed technologies to be in the field at any given time without issue). While non-volatile memory adjustments could be made using an external interface, a technical representative, service engineer, or remote connection directly to the machine, these other methods do not provide the easy, automated capability to immediately adjust parameters as needed based on the specific device (and its customer replaceable units 212) that is installed into the machine. Additionally, these other options all add to the post sale service cost of the print engine.

Many items within a printing engine, such as actuators, are discussed above. These actuators can include items that move physically, such as solenoids, etc., and can also include electro-photographic actuators. Each marking technology is associated with different marking technology actuators. Electro-photographic actuators include items such as the coronode voltage and the grid voltage of the electro-photographic marking engine. Electro-photographic systems include various levels of control loops for maintaining the electro-photographic actuators at set points.

For example, an electro-photographic marking engine may include a charging element, an exposure element, a developer, and a fuser, which each can be associated with one or more electro-photographic actuators. The charging element may be a corotron, a scorotron, or a dicorotron. In each of these devices, a voltage is applied to a coronode (wire or pins) to ionize surrounding air molecules, which in turn causes a charge to be applied to a photoconductive belt or drum. Where the charging element is a scorotron, the scorotron includes a grid, to which a grid voltage is applied. The scorotron grid is located between the coronode and the photoconductor and helps to control the charge strength and uniformity of the charge applied to the photoconductor. The coronode voltage and the grid voltage are electro-photographic actuators. Changing either voltage may result in a change in the charge applied to the photoconductor, which in turn may affect an amount of toner attracted to the photoconductor and therefore the lightness or darkness of a printed or rendered image. Many electro-photographic marking engines include one or more electrostatic volt meters (ESV) for measuring the charge applied to the photoconductor. In such systems, a control loop receives information from the ESV and adjusts one or both of the coronode voltage and the grid voltage in order to maintain a desired ESV measurement. See U.S. Pat. No. 7,593,130 (the complete disclosure of which is incorporated herein) and the disclosures mentioned therein for a more complete description of electro-photographic actuators.

While only a few actuators are discussed above, those ordinarily skilled in the art would understand that many other actuators could be used with embodiments herein and the term "actuators" as used herein includes all such meanings.

Many computerized devices are discussed above. Computerized devices that include chip-based central processing units (CPU's), input/output devices (including graphic user interfaces (GUI), memories, comparators, processors, etc. are well-known and readily available devices produced by manufacturers such as Dell Computers, Round Rock Tex., USA and Apple Computer Co., Cupertino Calif., USA. Such computerized devices commonly include input/output devices, power supplies, processors, electronic storage memories, wiring, etc., the details of which are omitted herefrom to allow the reader to focus on the salient aspects of the embodiments described herein. Similarly, scanners and other similar peripheral equipment are available from Xerox Corporation, Norwalk, Conn., USA and the details of such devices are not discussed herein for purposes of brevity and reader focus.

The terms printer or printing device as used herein encompasses any apparatus, such as a digital copier, bookmaking machine, facsimile machine, multi-function machine, etc., which performs a print outputting function for any purpose. The details of printers, printing engines, etc., are well-known by those ordinarily skilled in the art and are discussed in, for example, U.S. Pat. No. 6,032,004, the complete disclosure of which is fully incorporated herein by reference. The embodiments herein can encompass embodiments that print in color, monochrome, or handle color or monochrome image data. All foregoing embodiments are specifically applicable to electrostatographic and/or xerographic machines and/or processes.

It will be appreciated that the above-disclosed and other features and functions, or alternatives thereof, may be desirably combined into many other different systems or applications. Various presently unforeseen or unanticipated alternatives, modifications, variations, or improvements therein may be subsequently made by those skilled in the art which are also intended to be encompassed by the following claims. The claims can encompass embodiments in hardware, software, and/or a combination thereof. Unless specifically defined in a specific claim itself, steps or components of the embodiments herein cannot be implied or imported from any above example as limitations to any particular order, number, position, size, shape, angle, color, or material.

What is claimed is:

1. A printing device comprising:
   at least one printing engine comprising actuators;
   at least one engine controller operatively connected to said printing engine, said engine controller using software to control operations of said printing engine;
   at least one non-volatile memory operatively connected to said engine controller, said non-volatile memory storing values used by said engine controller to control operations of said printing engine; and
   at least one adapter card operatively connected to said non-volatile memory and to said actuators,
   said adapter card storing data;
   said adapter card using said data to control said actuators by bypassing said engine controller when communicating with said actuators; and
   said adapter card providing adapter card feedback to said non-volatile memory.

2. The printing device according to claim 1, said adapter card comprising a physically separate device from said engine controller.

3. The printing device according to claim 1, said adapter card comprising:
   a printed circuit board;
   at least one logic unit mounted on said printed circuit board;
   wiring within said printed circuit board connected to said logic unit; and
   connection terminals on said printed circuit board connected to said wiring, said connection terminals being operatively connected to said non-volatile memory.

4. The printing device according to claim 1, said adapter card being connected to said non-volatile memory through one of the following interfaces:
   TCP/IP based web server interface;
   front panel keyboard wedge interface;
   service interface;
   print job submission interface; and
   direct hardwired connection.

5. The printing device according to claim 1, said adapter card comprising an item designed to be installed in said printing device after said printing device is in post production, customer service.

6. A printing device comprising:
   at least one printing engine comprising actuators and sensors;
   at least one engine controller operatively connected to said printing engine, said engine controller using software to control operations of said printing engine;
   at least one non-volatile memory operatively connected to said engine controller, said non-volatile memory storing values used by said engine controller to control operations of said printing engine; and
   at least one adapter card operatively connected to said non-volatile memory and to said actuators and sensors,
   said adapter card storing data and receiving sensor feedback from said sensors;
   said adapter card using said data and said sensor feedback to control said actuators by bypassing said engine controller when communicating with said actuators; and
   said adapter card providing adapter card feedback to said non-volatile memory.

7. The printing device according to claim 6, said adapter card comprising a physically separate device from said engine controller.

8. The printing device according to claim 6, said adapter card comprising:
   a printed circuit board;
   at least one logic unit mounted on said printed circuit board;
   wiring within said printed circuit board connected to said logic unit; and
   connection terminals on said printed circuit board connected to said wiring, said connection terminals being operatively connected to said non-volatile memory.

9. The printing device according to claim 6, said adapter card being connected to said non-volatile memory through one of the following interfaces:
   TCP/IP based web server interface;
   front panel keyboard wedge interface;
   service interface;
   print job submission interface; and
   direct hardwired connection.

10. The printing device according to claim 6, said adapter card comprising an item designed to be installed in said printing device after said printing device is in post production, customer service.

11. A printing device comprising:
at least one printing engine comprising sensors, first actuators, and second actuators;
at least one engine controller operatively connected to said printing engine, said engine controller using software to control operations of said printing engine;
at least one non-volatile memory operatively connected to said engine controller, said non-volatile memory storing values used by said engine controller to control operations of said printing engine; and
at least one adapter card operatively connected to said non-volatile memory and to said sensors and said second actuators,
said first actuators corresponding to a design of said controller, said second actuators corresponding to a design of said adapter card,
said adapter card storing data and receiving feedback from said sensors, and
said adapter card using said data and said feedback to control said actuators by bypassing said engine controller when communicating with said second actuators.

12. The printing device according to claim 11, said adapter card comprising a physically separate device from said engine controller.

13. The printing device according to claim 11, said adapter card comprising:
a printed circuit board;
at least one logic unit mounted on said printed circuit board;
wiring within said printed circuit board connected to said logic unit; and
connection terminals on said printed circuit board connected to said wiring, said connection terminals being operatively connected to said non-volatile memory.

14. The printing device according to claim 11, said adapter card being connected to said non-volatile memory through one of the following interfaces:
TCP/IP based web server interface;
front panel keyboard wedge interface;
service interface;
print job submission interface; and
direct hardwired connection.

15. The printing device according to claim 1, said adapter card comprising an item designed to be installed in said printing device after said printing device is in post production, customer service.

16. A printing device comprising:
at least one printing engine comprising actuators;
at least one engine controller operatively connected to said printing engine, said engine controller using software to control operations of said printing engine;
at least one non-volatile memory operatively connected to said engine controller, said non-volatile memory storing values used by said engine controller to control operations of said printing engine; and
at least one adapter card operatively connected to said non-volatile memory and to said actuators;
said adapter card reading incoming print jobs before said print jobs are delivered to said controller,
said adapter card using said print jobs to adjust said actuators in coordination with said engine controller,
said adapter card storing data and actuator settings; and
said adapter card using said print jobs, and said data and actuator settings to adjust settings within said non-volatile memory.

17. The printing device according to claim 16, said adapter card comprising a physically separate device from said engine controller.

18. The printing device according to claim 16, said adapter card comprising:
a printed circuit board;
at least one logic unit mounted on said printed circuit board;
wiring within said printed circuit board connected to said logic unit; and
connection terminals on said printed circuit board connected to said wiring, said connection terminals being operatively connected to said non-volatile memory.

19. The printing device according to claim 16, said adapter card being connected to said non-volatile memory through one of the following interfaces:
TCP/IP based web server interface;
front panel keyboard wedge interface;
service interface;
print job submission interface; and
direct hardwired connection.

20. The printing device according to claim 16, said adapter card comprising an item designed to be installed in said printing device after said printing device is in post production, customer service.

* * * * *